United States Patent [19]
Clark

[11] 4,157,863
[45] Jun. 12, 1979

[54] ACOUSTO-OPTIC MODULATOR

[75] Inventor: Joseph A. Clark, Washington, D.C.

[73] Assignee: The United States of America as represented by the Secretary of the Navy, Washington, D.C.

[21] Appl. No.: 894,059

[22] Filed: Apr. 6, 1978

[51] Int. Cl.² .............................................. G02F 1/11
[52] U.S. Cl. ...................................... 350/358; 350/359; 350/360
[58] Field of Search ............... 350/358, 353, 359, 360, 350/96.12, 96.13, 96.15

[56] References Cited
U.S. PATENT DOCUMENTS

| | | | |
|---|---|---|---|
| 3,547,520 | 12/1970 | Lea et al. | 350/358 X |
| 3,736,044 | 5/1973 | Lean et al. | 350/358 |
| 3,746,785 | 7/1973 | Goodrich | 350/358 |
| 3,796,480 | 3/1974 | Perston, Jr. et al. | 350/360 |
| 3,891,308 | 6/1975 | Hawkins | 350/358 |
| 3,930,718 | 1/1976 | Jensen | 350/356 |
| 3,938,881 | 2/1976 | Biegelsen et al. | 350/358 |

*Primary Examiner*—James W. Davie
*Attorney, Agent, or Firm*—R. S. Sciascia; R. F. Beers; Sol Sheinbein

[57] ABSTRACT

An acousto-optical modulator for modulating light with surface waves. Surface waves are excited on an aluminum plate which is tapered to terminate in a wedge type formation, the surface wave transmitted in the direction of the wedge. The waves are amplified by the wedge and transmitted to a membrane, which has been mirrored on one surface and stretched over a U shaped frame and part of the wedge. Light illuminating the mirrored surface is both spatially and temporally modulated by the surface waves transmitted through the wedge to the membrane.

10 Claims, 2 Drawing Figures

FIG. 1
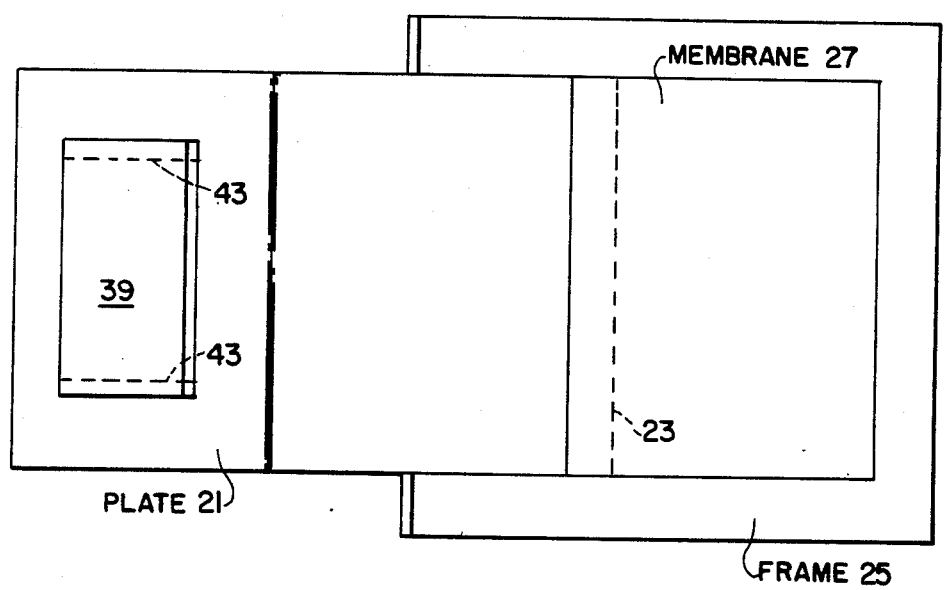
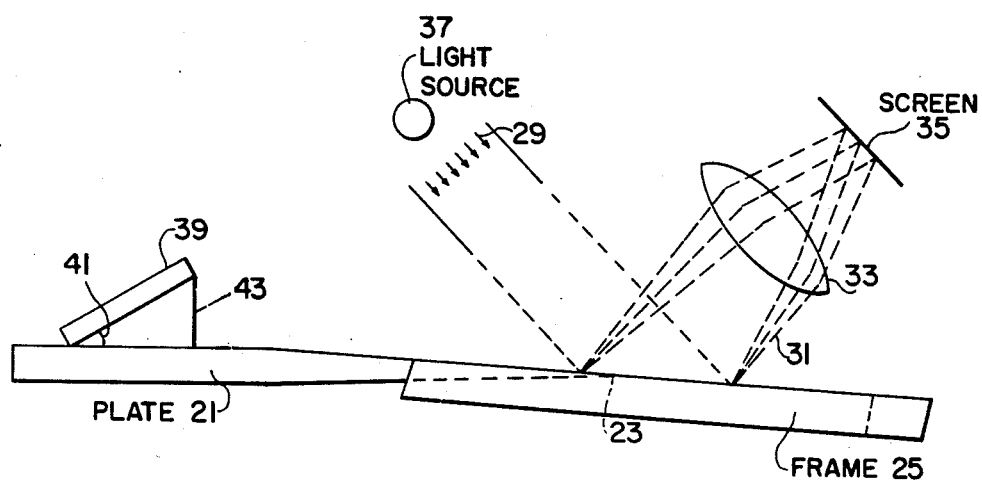
FIG. 2

ACOUSTO-OPTIC MODULATOR

BACKGROUND OF THE INVENTION

The present invention relates to light modulators and more specifically to light moudlators employing surface waves as their source of modulation.

Acoustic bandwidth modulation of light has been achieved using two basically different techniques, volume diffraction of a light beam by bulk acoustic waves (Bragg diffraction), and surface reflection or diffraction.

Volume diffraction techniques employ a medium whose refractive index can be varied in accordance with the modulating signal. In U.S. Pat. No. 3,938,881, a transducer generates an acoustic strain wave which alters the refractive index of an acousto-optic medium. Light incident upon the medium near the Bragg angle is modulated according to the strain wave. However, bulk acoustic wave Bragg diffraction modulators designed to be operated at high power efficiency do not develop sufficient spatial modulation bandwidth.

Surface modulation of light occurs when light is modulated as it is reflected from a surface to which the modulating signal has been transmitted. Various techniques have been used to transmit this signal to the reflective surface. In one such method, the surface is excited by the direct acoustic pressure of an incident sound wave. A second method employs solid surface modulations produced by piezoelectrically excited Rayleigh waves. Both of these techniques require impractically large acoustic power levels to achieve significant bandwidth at high diffraction efficiency.

In another surface modulation technique, a free liquid surface is excited by radiation pressure. This is a quasistatic effect associated with continous, finite amplitude sound waves. However, free surface modulation produces only narrow temporal modulation bandwidth and the devices employing it cannot be fabricated to be rugged.

All of these reflective surface devices, when designed to operate over wide spatial bandwidths at temporal bandwidths below one megahertz are too large to be practical.

Recent attempts to improve surface reflection light modulators have been directed toward improving modulators that use a mirrored membrane as their reflective surface. These devices use an electric signal carrying modulation information to electro-statically deflect the membrane. In U.S. Pat. No. 3,796,480 improvement of the localized deflection of the membrane is disclosed. This modulation and others like it do not modulate with surface waves.

SUMMARY OF THE INVENTION

Accordingly, the present invention provides a surface wave light modulator with an aluminum plate of uniform thickness at one end and shaped to terminate in a wedge configuration at the other end. A "U" shaped frame is fastened to the sides of the wedge, and a membrane, coated on one side with a mirror surface, is stretched over the frame and a portion of the wedge within the boundary of the frame. The plate causes surface waves to be excited when its surface is modulated. These surface waves are transmitted and amplified through the wedge and then transferred to the membrane. When the mirrored surface of the membrane is illuminated, it causes the light reflected from it to be modulated in accordance to the surface waves excited in the plate. Phase modulations can be detected by focusing the reflected light beam with a lens onto a screen.

OBJECTS OF THE INVENTION

It is therefore an object of the present invention to provide a new and improved light modulator.

A further object of the present invention is to modulate light in the waterborne acoustic bandwidth range.

Another object of this invention is to provide a light modulator which will spatially and temporally modualte a beam of light.

Still another object of this invention is to provide a highly efficient light modulator.

Yet another object of the present invention is to modulate light with surface waves without distortion.

A further object of the present invention is to provide a light modulator having controllable and useful intermodulation effects and capable of frequency multiplication.

A still further object of the present invention is to provide a light modulator capable of transferring, processing, transiently storing, and displaying a multichannel flow of information.

Another object of the present invention is to provide a light modulator that is structurally compact, rugged, simple to construct, and offers design flexibility.

Yet another object of the present invention is to provide a light modulator that is capable of retarding the propagation velocity of surface waves.

A still further object of the present invention is to provide a light modulator that will amplify surface waves.

Still another object of the present invention is to provide a light modulator to operate with a high acousto-optic diffraction efficiency and produce controllable intermodulation effects.

BRIEF DESCRIPTION OF THE DRAWINGS

Other objects and many of the attendant advantages of this invention will be readily appreciated as the same becomes better understood by reference to the following detailed description when considered in connection with the accompanying drawings, wherein:

FIG. 1 is a top view of the acousto-optic modulator according to the instant invention; and FIG. 2 is a side view of the acousto-optic modulator according to the instant invention.

DESCRIPTION OF THE PREFERRED EMBODIMENT

Referring now to the drawings wherein like reference characters designate like or corresponding parts throughout the several views, FIGS. 1 and 2 show a thin aluminum plate 21 of uniform thickness on the order of one-eighth inch at one end thereof which is very slowly tapered to terminate at a wedge configuration 23. A "U" shaped squared off, rigid frame 25, preferably of plastic or aluminum, is fastened to the sides of plate 21 such that the wedge portion contacts both legs of the frame and a portion of the tapered faces of the plate is contained within the boundaries of the frame. Approximately one third of the length of each of the legs of frame 25 touches and is connected to the sides of plate 21.

A membrane 27, such as polyethylene terephthalate (tradename: Mylar) is stretched over, tensioned and fastened to frame 25 by epoxy and that portion of plate 21 contained within the boundaries of the frame. At least the top surface of membrane 27 is coated with a mirror surface by the vacuum deposition of aluminum or an alternate suitable method.

Referring now to FIG. 2, surface waves are selectively excited in plate 21 when its surface is modulated, such as by an array of piezo-electric transducers 39 mounted therewith at the coincidence angle 41 of the plate. A wedge 43, preferably of plastic, retains transducers 39 in place. Such transducer principles which excite the plate 21 very strongly, are well known and can be found in such references as "Rayleigh and Lamb Waves, Physical Tehory and Application," I. A. Viktorov, Plenum Press, 1967. Normally, the excited surface waves are of the lowest symmetric plate wave type and propagate at a velocity about three times that of sound waves in water. Depending upon the particular application of this invention, surface waves may be excited in plate 21 by a variety of methods. Plate 21 can be partially immersed in water, thereby sensing waterborne acoustic waves. Other alternatives include excitation by means of a shock wave, a hammer blow, or other mechanical means.

Surface waves excited in plate 21 propagate along the surface to the wedge portion thereof. The wedge 23 normally causes the displacement amplitude of surface waves propagating from the plate 21 to the wedge apex 23 to be greatly amplified. If the wedge angle is approximately less than six degrees, then the waves are amplified in inverse proportion to the thickness change of the plate. Thickness changes of at least 1000 times can be achieved. Very important to the invention is that the edge of wedge 23 be maintained extremely thin and sharp, thereby enabling extremely large amplifications. These amplified waves are transmitted to the membrane 27 stretched across frame 25.

Membrane 27 causes the amplified surface wave to be converted from a plate wave type to a membrane wave type. Such waves are fully described in such standard texts as "Vibration and Sound," P. M. Morse, McGraw-Hill, 1948. The propagation velocity of membrane waves in normally 10 to 100 times slower than that of plate waves, thereby causing the amplified surface waves to be significantly retarded as they propagate away from the membrane-wedge connection.

In operation, a light beam 29 from a light source illuminates the mirrored surface of membrane 27. The amplified and retarded surface waves phase-modulate the reflected beam 31. These phase modulations can be easily detected by focusing the reflected beam 31 with a lens 33 to a point on the screen 35. Each component of the spatial and temporal spectrum will then produce a point of light at a different location on screen 35.

Therefore, it is apparent that there is provided by this invention an improved acousto-optic modulator. The wedge 23, because of its amplifying quality, results in improved power efficiency, requiring less electrical power for a comparable level of diffraction efficiency, or alternatively less optical power is required to achieve a comparable level of output signal.

The use of a thin plate 21 allows for the selective excitation of spatially and temporally modulated surface waves. The wedge 23, having a narrow angle, amplifies these waves without distortion. Improved design flexibility results from the membrane retardation of surface waves. This allows for the handling of multiple parallel channels with lower electrical carrier signal frequencies or a smaller modulator and optical beams. Also, information corresponding to long periods of time can be transiently stored in small regions of the membrane, enabling the display of more temporal information.

Due to the nonlinear characteristics of optical diffraction by phase modulations which approach one optical wavelength in amplitude, new operations can be performed such as spatial and temporal frequency multiplication and mixing of information carriers. These characteristics, coupled with overall design flexibility enable this modulator to transfer, process, transiently store, and display a multi-channel flow of information. Information can be transferred from an electrical carrier to an optical one by recording the carrier information as temporal and spatial modulations of a surface wave. Processing of information is achieved by employing intermodulation effects associated with superimposed surface waves. Information can be transiently stored as a surface wave and then retrieved by a photoelectric detector placed in the plane of screen 35. The screen 35 itself is a convenient method for displaying a multichannel flow of information.

Obviously many other embodiments and modifications of the present invention will readily come to those of ordinary skill in the art having the benefit of the teachings presented in the foregoing description and in the drawings. For example, the plate 21 and wedge 23 can be fabricated from other materials such as glass or a variety of metals. The plate 21 can excite other modes of surface waves such as higher order dispersive and nondispersive plate waves. Modulation can be made by mechanical means or waterborne sound waves. Several plates can be joined into a single wedge and several plates and wedges can be combined on a single membrane. The membrane 27 can be fabricated from other materials such as stiffened or mass loaded membranes or composite membranes and can be used to excite other modes of surface waves such as flexural waves on a stiffened membrane. The wedge angle and angle between the wedge and membrane can be varied, and combinations of modulators can be used to successively modulate a single light beam.

These and other comparable alternative embodiments allow the instant modulator to be incorporated into a variety of multichannel information handling systems to improve and enhance their operation, such as active and passive sonar array processors, frequency azimuth analyzers, multichannel acoustical communication systems and acousto-optic information handling systems. It is therefore to be understood that this invention is not to be limited thereto and that said modification and embodiments are intended to be included within the scope of the appended claims.

What is new and desired to be secured by Letters Patent of the United States is:

1. A light modulating device comprising:
   a plate tapered at one end thereof to terminate in a wedge configuration;
   a frame coupled to said wedge;
   means for exciting surface waves in said plate; and
   light reflective means positioned over said frame and plate, said light reflective means in contact with said frame;
   whereby a light beam incident upon said reflective means is spatially and temporally modulated by said surface waves as it is reflected from said reflective means.

2. The device of claim 1 wherein said reflective means is a membrane having a reflective surface.

3. The device of claim 1 wherein said exciting means comprises piezo-electric transducers mounted on said plate at the coincidence angle thereof.

4. The device of claim 2 wherein said frame is a U shaped, plastic member.

5. The device of claim 4 wherein said plate comprises aluminum.

6. The device of claim 5 wherein the inside angle of said wedge is approximately six degrees, said plate tapered to said angle very slowly, whereby said surface waves are amplified greatly, the amplification inversely proportional to the thickness change of the plate.

7. The device of claim 6 wherein said surface waves are in a plate wave mode when excited onto said plate which are converted to a retarded membrane wave mode when transferred to said membrane.

8. The device of claim 5 wherein the legs of said frame are in contact with said plate.

9. The device of claim 1 further including a screen to receive and display said reflected light.

10. The device of claim 2, wherein said membrane is stretched, tensioned and glued to said frame and plate.

* * * * *